(12) United States Patent
Musa et al.

(10) Patent No.: US 6,441,121 B1
(45) Date of Patent: Aug. 27, 2002

(54) EPOXY COMPOUNDS CONTAINING STYRENIC OR CINNAMYL FUNCTIONALITY

(75) Inventors: Osama M. Musa, Hillsborough, NJ (US); Harry Richard Kuder, Fullerton, CA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/966,449

(22) Filed: Sep. 28, 2001

(51) Int. Cl.[7] ............................................... C08G 59/04
(52) U.S. Cl. .................. 528/103; 523/466; 525/524; 528/418; 528/419; 528/422; 549/543; 549/546; 549/563
(58) Field of Search ................. 549/512, 513, 549/543, 546, 563; 523/466; 525/524; 528/103, 418, 419, 422

(56) References Cited

U.S. PATENT DOCUMENTS 5,300,618 A * 4/1994 Durairaj .................. 528/101
5,495,029 A 2/1996 Steinmann et al. ......... 549/545
6,057,460 A 5/2000 Moszner et al. ............ 549/463

OTHER PUBLICATIONS

Morel, F.: "Kinetic study of the photo–induced copolymerization of N–substituted maleimides with electron donor monomers"; Polymer 40 (1999) 2447–2454.

Jones, Richard G.: "Facile synthesis of epoxystyrene and its copolymerisations with styrene by living free radical and atom transfer radical strategies"; Polymer 40 (1999) 2411–2418.

ACS Registry Structure Search; 29 References; 13 Pages.
ACS Registry Structure Search; 62 References; 25 Pages.
ACS Registry Search; 68 References; 28 Pages.
ACS Registry Structure Search; 14 Structures; 6 Pages.
ACS Registry Search; 12 Pages.

* cited by examiner

Primary Examiner—Robert Dawson
Assistant Examiner—D. Aylward
(74) Attorney, Agent, or Firm—Jane E. Gennaro

(57) ABSTRACT

A curable composition comprises a compound having at least one epoxy group and at least one styrenic or cinnamyl group per molecule.

3 Claims, No Drawings

EPOXY COMPOUNDS CONTAINING STYRENIC OR CINNAMYL FUNCTIONALITY

FIELD OF THE INVENTION

This invention relates to compounds that contain both epoxy and styrenic or cinnamyl functionality and that can be used in curable compositions.

BACKGROUND OF THE INVENTION

Curable compositions are used in the fabrication and assembly of semiconductor packages and microelectronic devices, such as in the bonding of integrated circuit chips to lead frames or other substrates, in the bonding of circuit packages or assemblies to printed wire boards, or in encapsulants or coating materials. There are a number of electron donor/electron acceptor adhesive systems that are used in the industry, but not all these give as full performance as is needed for all uses. The compounds disclosed in this specification add to the spectrum of performance materials for use within the semiconductor fabrication industry.

SUMMARY OF THE INVENTION

In one embodiment, this invention relates to compounds that contain both epoxy and styrenic or cinnamyl functionality. In another embodiment, this invention is a curable composition, such as an adhesive, coating, or encapsulant composition, containing such compounds.

DETAILED DESCRIPTION OF THE INVENTION

In one embodiment, this invention is a compound having at least one epoxy group and one styrenic or cinnamyl group per molecule. In another embodiment, this invention is a curable composition, such as an adhesive, coating, or encapsulant, containing the compound with both epoxy and styrenic or cinnamyl functionality. The composition can be a paste, prepared by blending or milling, or can be a film, prepared by standard film making techniques known to those skilled in the art. The curable composition will include optionally a curing agent, and optionally a filler.

These compounds can be the main component in the curable composition or can be added as an adhesion promoter to one or more other curable resins. When used as an adhesion promoter, the amount used in the curable composition will be an effective amount to promote adhesion and, in general, an effective amount will range from 0.005 to 20.0 percent by weight of the formulation.

Examples of other curable resins for use as the main component in the curable compositions include epoxies, vinyl ethers, thiolenes, compounds derived from cinnamyl and styrenic starting compounds, fumarates, maleates, acrylates, and maleimides.

Suitable curing agents are thermal initiators and photoinitiators present in an effective amount to cure the composition. In general, those amounts will range from 0.5% to 30%, preferably 1% to 20%, by weight of the total organic material (that is, excluding any inorganic fillers) in the composition. Preferred thermal initiators include peroxides, such as butyl peroctoates and dicumyl peroxide, and azo compounds, such as 2,2'-azobis (2-methyl-propanenitrile) and 2,2'-azobis(2-methyl-butanenitrile). A preferred series of photoinitiators is one sold under the trademark Irgacure by Ciba Specialty Chemicals. In some formulations, both thermal initiation and photoinitiation may be desirable: the curing process can be started either by irradiation, followed by heat, or can be started by heat, followed by irradiation.

In general, the curable compositions will cure within a temperature range of 70° C. to 250° C., and curing will be effected within a range of ten seconds to three hours. The actual cure profile will vary with the components and can be determined without undue experimentation by the practitioner.

The curable compositions may also comprise nonconductive or thermally or electrically conductive fillers. Suitable conductive fillers are carbon black, graphite, gold, silver, copper, platinum, palladium, nickel, aluminum, silicon carbide, boron nitride, diamond, and alumina. Suitable nonconductive fillers are particles of vermiculite, mica, wollastonite, calcium carbonate, titania, sand, glass, fused silica, fumed silica, barium sulfate, and halogenated ethylene polymers, such as tetrafluoroethylene, trifluoroethylene, vinylidene fluoride, vinyl fluoride, vinylidene chloride, and vinyl chloride. If present, fillers generally will be in amounts of 20% to 90% by weight of the formulation.

In another embodiment, this invention is a curable composition comprising the compound having at least one epoxy group and at least one styrenic or cinnamyl group per molecule and an epoxy resin. In a preferred embodiment, the epoxy resin has the structure

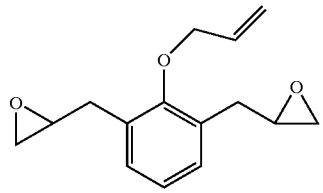

The following Examples disclose representative compounds containing at least one epoxy group and one styrenic or cinnamyl group per molecule and the synthetic procedures for making those compounds. Also disclosed is the performance of samples in curable compositions.

EXAMPLES

Example 1.

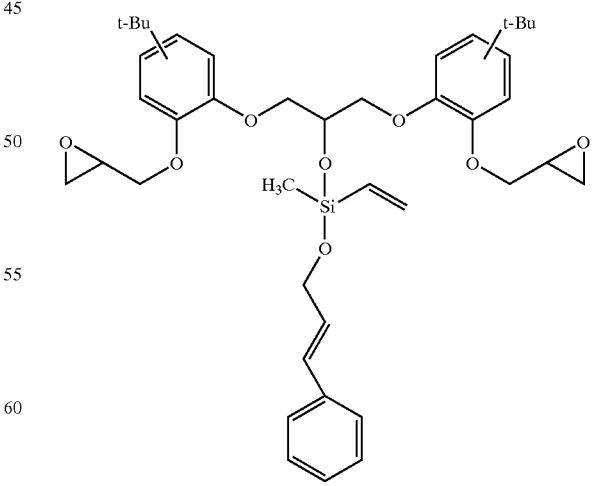

in which t-Bu stands for a tertiary butyl group. One mole equivalent of EPICLON EXA-7120 (alcohol) is mixed into triethylamine in dry toluene at 0° C., after which is added one mole equivalent of vinyl silane dissolved in toluene. The mixture is allowed to react for four hours at room temperature. The solvent is evaporated to give a product that is mixed into triethylamine in dry toluene at 0° C. Cinnamyl alcohol in toluene is added and the reaction mixture reacted for four hours at room temperature to give the final product.

Example 2.

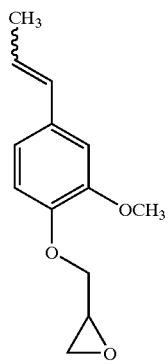

To a three-necked flask equipped with a mechanical stirrer, condenser and inlet/outlet tube was added isoeugenol (20 g, 0. 122 mole) and methyl ethyl ketone (100 mL). The flask contents were placed under nitrogen gas, and epichlorohydrin was added to the flask through a syringe. Stirring was initiated, and potassium carbonate (33.72 g, 0.244 mole) was added. The reaction was heated at 50° C. for 11 hours, after which the reaction mixture was allowed to cool to room temperature. The reaction product was vacuum filtered and the filtrate washed with 5% NaOH and 10% $Na_2SO_4$. The organic layer was dried over $MgSO_4$ and evaporation of the solvent gave the product in 89% yield.

Example 3.

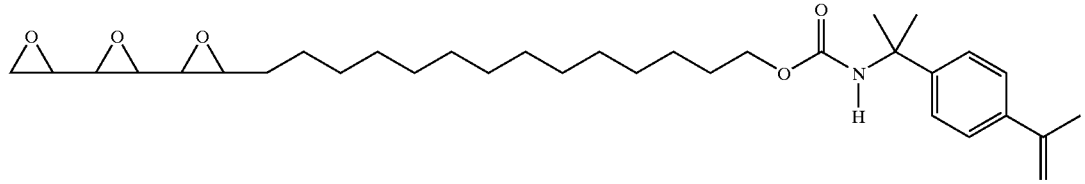

3-Isopropenyl-α,α-dimethylbenzyl isocyanate (m-TMI, 1.91 g, 0.00592 mole) was solvated in 50 mL THF in a 500 mL three-necked flask equipped with a mechanical stirrer, addition funnel and nitrogen inlet/outlet tube. The reaction was placed under nitrogen, and 0.01 equiv. dibutyltin dilaurate (catalyst) was added with stirring as the solution was heated to 80° C. The addition funnel was charged with Kraton liquid polymer L-207 (39.05 g, 0.00592 mole) dissolved in 50 mL THF. This solution was added to the isocyanate solution over ten minutes, and the resulting mixture heated for an additional 30 hours at 80° C. After the reaction was allowed to cool to room temperature, the mixture was washed with distilled water three times. The organic layer was isolated and dried over $MgSO_4$, filtered, and the solvent removed in vacuo to give the product in 97% yield.

Example 4.

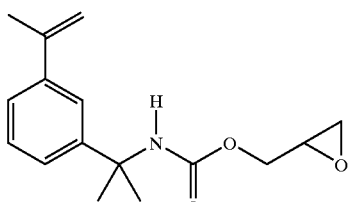

3-Isopropenyl-α,α-dimethylbenzyl isocyanate (m-TMI, 80.75 g, 0.40 mole) was solvated in 100 mL toluene in a 500 mL three-necked flask equipped with a mechanical stirrer, addition funnel and nitrogen inlet/outlet. The reaction was placed under nitrogen, and 0.01 equiv. dibutyltin dilaurate (catalyst) was added with stirring as the solution was heated to 60° C. The addition funnel was charged with glycidol (29.65 g, 0.40 mole) dissolved in 50 mL toluene. This solution was added to the isocyanate solution over 10 minutes, and the resulting mixture heated for an additional 30 hours at 60° C. After the reaction was allowed to cool to room temperature, the mixture was washed with distilled water three times. The organic layer was isolated and dried over $MgSO_4$, filtered, and the solvent removed in vacuo to give the product in 95% yield.

Example 5.

Performance. A curable composition was prepared comprising a bismaleimide, a compound with cinnamyl functionality, curing agents, and 75% by weight silver. To this composition was added an epoxy at 1 weight percent, or a compound from Example 2, 3, or 4, at 1 weight percent, or a blend of an epoxy at 1 weight percent and one of the compounds from the examples at 1 weight percent. These compositions were tested for adhesive strength as die attach adhesives.

The epoxy used in this formulation has the structure:

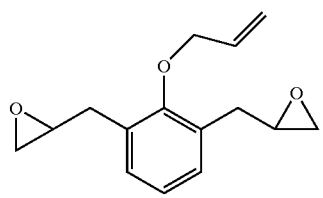

The adhesive was dispensed on a copper leadframe (die pad, 650×650 mil), a silicon die (500×500 mil) placed onto the adhesive, and the adhesive cured in an oven at 175° C. for 30 minutes. Ten assemblies for each adhesive composition were prepared. The die was sheared from the leadframe at 90 degrees with a Dage 2400-PC Die Shear Tester at 250°

C. and the results recorded in Kilogram force. The results were pooled and averaged and are set out in the following table.

| FORMULATION | Die Shear Strength at 250° C. in KgF |
|---|---|
| Control | 5.9 |
| Control with epoxy | 11.5 |
| Control with cmpd from Ex 2 | 8.3 |
| Control with cmpd from Ex 3 | 9.3 |
| Control with cmpd from Ex 4 | 12.8 |
| Control with blend of epoxy and cmpd from Ex 2 | 37.9 |
| Control with blend of Epoxy and cmpd from Ex 3 | 38.9 |
| Control with blend of Epoxy and cmpd from Ex 4 | 30.9 |

A second set of cured assemblies was subjected further to 85° C./85% relative humidity for 48 hours, after which each die was sheared from the leadframe at 260° C. as before, the results pooled and averaged and set out in the following table.

| FORMULATION | Die Shear Strength at 260° C. in KgF |
|---|---|
| Control | 5.4 |
| Control with epoxy | 11.4 |
| Control with cmpd from Ex 2 | 3.9 |
| Control with cmpd from Ex 3 | 8.8 |
| Control with cmpd from Ex 4 | 3.6 |
| Control with blend of Epoxy and cmpd from Ex 2 | 23.8 |
| Control with blend of Epoxy and cmpd from Ex 3 | 36.2 |
| Control with blend of Epoxy and cmpd from Ex 4 | 23.3 |

The results show that the compounds from the Examples perform comparably to the added epoxy under the above conditions, and the combination of the epoxy and the compounds from the Examples give superior results in die shear strength to either the epoxy or a compound from the Examples when used alone.

What is claimed is:

1. A compound containing at least one epoxy group and at least one styrenic group selected from the group consisting of

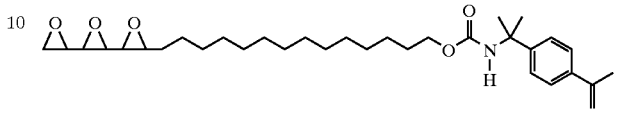

and

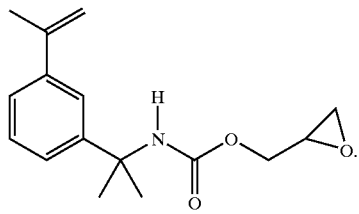

2. A curable composition comprising a compound having at least one epoxy group and at least one styrenic or one cinnamyl group per molecule, a curing agent, a filler, and an epoxy compound.

3. The curable composition according to claim 2 in which the epoxy compound has the structure

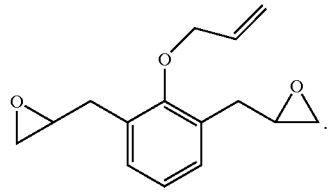

* * * * *